July 23, 1940. H. T. KRAFT 2,208,868
METHOD AND APPARATUS FOR REINFORCING INNER TUBES
Filed March 15, 1937 2 Sheets-Sheet 1

INVENTOR
Herman T. Kraft
BY
Evans + McCoy
ATTORNEYS

July 23, 1940.  H. T. KRAFT  2,208,868
METHOD AND APPARATUS FOR REINFORCING INNER TUBES
Filed March 15, 1937  2 Sheets-Sheet 2

INVENTOR
*Herman T. Kraft*
BY
*Evans + McCoy*
ATTORNEYS

Patented July 23, 1940

2,208,868

UNITED STATES PATENT OFFICE 2,208,868

METHOD AND APPARATUS FOR REINFORCING INNER TUBES

Herman T. Kraft, Akron, Ohio, assignor to The General Tire & Rubber Company, Akron, Ohio, a corporation of Ohio Application March 15, 1937, Serial No. 130,999

14 Claims. (Cl. 91—42)

This invention relates to improvements in means for reinforcing inner tubes for automobiles, trucks and the like and has for its principal object the provision of a novel method and apparatus for strengthening inner tubes and making them substantially punctureproof.

Various preparations designed to reinforce a tube and render same punctureproof have been previously employed, these preparations usually being introduced into the tube while they are in the liquid state, and for the most part they remain in the liquid state. When the car is at rest the substance settles to the lower portion of the tube and after driving is resumed it takes some little time before a redistribution of the fluid material occurs and during this period of redistribution the wheels are accordingly out of balance. These solutions have been unsatisfactory for the most part inasmuch as the elements composing the mixture begin to break down or physically separate in a relatively short period of time, particularly inasmuch as the several ingredients comprising the mixture have different specific gravities and the heavier substances are forced outwardly by centrifugal action.

Another disadvantage of preparations which remain in a liquid form is that if a nail or other foreign element enters the tire from the side, rather than from the tread portion, the punctureproofing material which is concentrated largely in the central portion of the tube does not reach the aperture so formed.

Most of the liquid preparations which are intended to harden rather than to remain in the liquid state soon become brittle, crack and lose their adhesion to the inner surface of the tire. Likewise, the tubes which are formed on a straight mandrel with a reinforcing strip along the inner surface of the tread portion have been unsatisfactory for the reason that there is too great a degree of fullness around the inner periphery of the tube, causing wrinkling and bad fitting qualities.

One of the objects of the present invention is the provision of an improved method for the treatment of inner tubes to make them substantially punctureproof, which method consists generally in introducing into the tube a suitable quantity of a viscous fluid which, if it were subjected to no other treatment, would remain in its fluid state under normal conditions, the fluid having the quality of entering any holes or cuts in the tube and sealing the same against loss of air. The tube is next inserted in a centrifuge or rotating device, comprising a disc having an annular flange therearound, forming a ring or band which encircles the tube. The tube is next inflated to a fair degree of pressure and the centrifuge is rotated rapidly for something less than one minute in order to secure an even distribution of the viscous material over the tread portion of the inner surface of the tube. While thus rapidly rotating the partially inflated tube, a suitable quantity of a substance capable of coagulating the punctureproofing liquid is introduced into the tube by means of the novel centrifuge hereinafter described. Rotation of the tube is continued for approximately ten seconds, after which the tube is removed from the machine. The coagulating fluid is largely concentrated adjacent to the surface of the punctureproofing material, thus leaving the portions of the material adjacent to the tube in a plastic or semifluid state and forming a protective, relatively tough coherent inner surface of the tread portion of the tube.

It is important that the inner diameter of the rotating bowl or flanged disc be of such diameter that when the tube has been inflated as previously described a considerable portion of the outer periphery of the tube be flattened in order that the fluid sealing substance be distributed over a somewhat wider area than the comparatively narrow width of the normal tread portion. By thus reinforcing the tube over this widened area, the tube is protected against nails or other foreign elements which enter the tire through the side walls.

By thus inflating the tube to a point wherein a broad flat surface is provided, the tube has been expanded considerably beyond its normally inflated transverse dimensions when positioned within a tire. Thus, when the reinforced tube is inserted within a tire and inflated, the endless reinforcing strip is considerably contracted or compressed transversely, and when a nail or other sharp element passes into the tire and tube and the nail thereafter withdrawn, the air pressure within the tube forces a portion of this compressed semifluid matter with its protective covering into the aperture so formed. Upon coming in contact with the outer air, this semifluid or plastic substance hardens and permanently closes the hole. The heat which is normally present within the tire also assists in the process of coagulating the fluid sealing substance.

Figure 1:
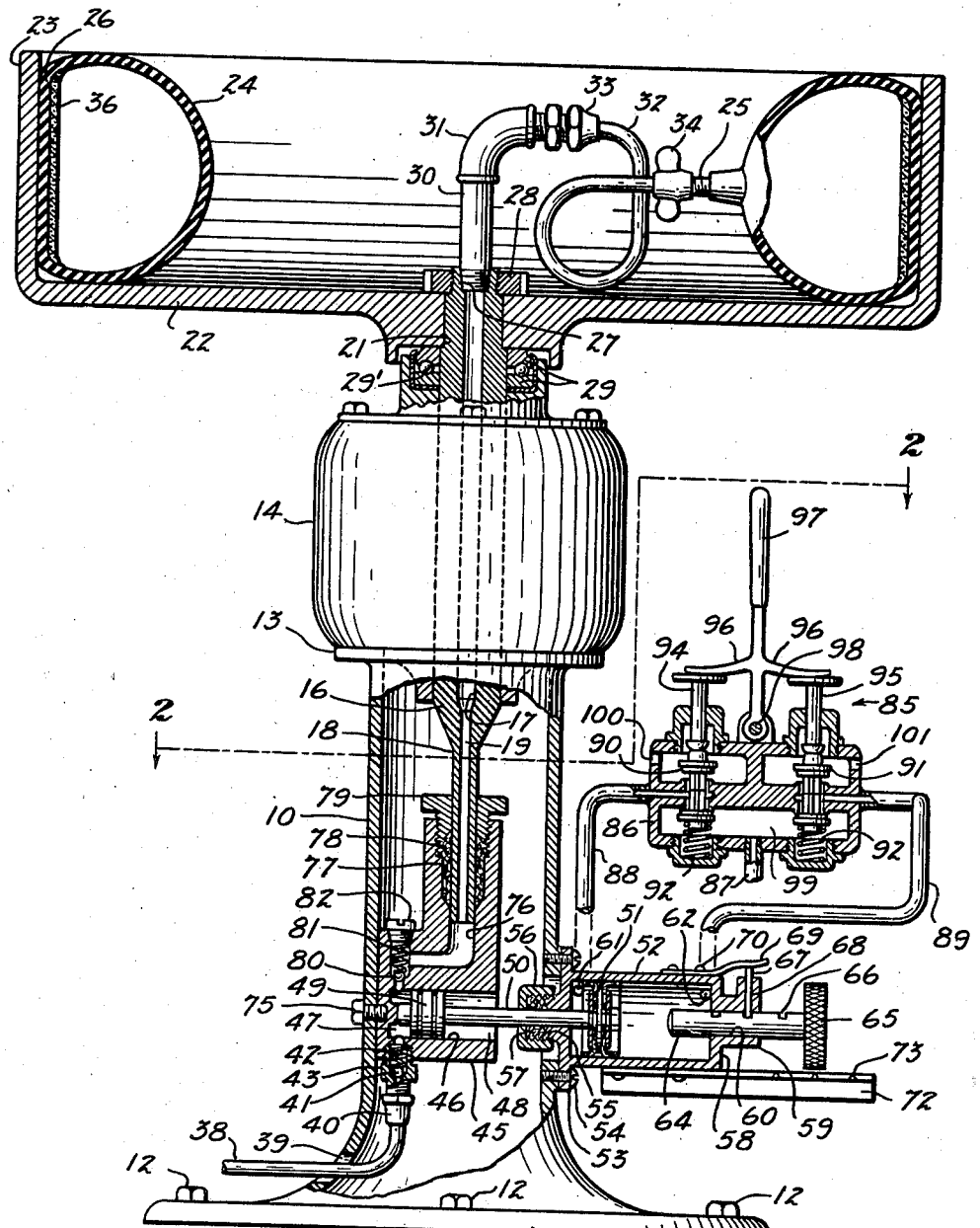
Figure 1 is a front elevation, partially in section, of the rotating device in its preferred form.

The fluid sealing substance which I employ usually includes a mixture of a suitable quantity of liquid latex having incorporated therein a filler such as wheat flour and a small quantity of glycerine or other substance which will prevent the mixture from freezing. As a coagulant, I prefer to employ a small quantity of glacial acetic acid which, when it comes in contact with the sealing mixture, causes almost instantaneous coagulation of the exposed surface of the sealing compound.

Glacial acetic acid is a rather rapid coagulant of the sealing fluid and can be employed only when the rotating device is employed. In many instances, however, it will be desirable to employ my method while the tube and tire are in place upon the wheel. In this instance I introduce into the tube a suitable quantity of the sealing fluid having incorporated therein a quantity of a somewhat slower coagulant, such as zinc chloride, and then run the car until substantialy complete coagulation has occured. This method of treatment is not, however, as satisfactory as the preferred method inasmuch as the coagulant becomes dispersed throughout the entire deposited mass and more or less hardening same. Another comparative disadvantage of this method is in the fact that it is impossible to secure as wide a band of the deposited material and the band is not of uniform thickness as in the other method.

The presently preferred embodiment of the rotating device or centrifuge comprises a hollow, vertical support 10 having an integrally formed base portion 11 which is adapted to be secured to the floor by means of bolts 12. The upper end of the vertical support is outwardly flared to form a seat 13 for an electric motor 14. This motor is provided with a vertical drive shaft 16 having a longitudinal bore 17 extending from end to end. The lower end of the shaft is formed with a reduced portion 18 and the bore 19 in this portion is likewise reduced in diameter. The upper terminal of the vertical shaft is formed with a reduced portion 21 to provide a seat for a circular, rotating member or bowl 22, having an upwardly turned, integrally formed flange 23 around the periphery thereof. The internal diameter of this annular flange portion is somewhat less than the external diameter of the tube to be reinforced.

The tube 24 is placed within the flange portion and is somewhat inflated by the introduction of air into valve stem 25, thereby causing the outer periphery of the inner tube to assume a flattened position indicated at 26. The upper end of the drive shaft 16 is formed with a reduced, threaded portion 27 which receives a nut 28 which holds the bowl in place. In order to more adequately support the bowl in its rotative movement, a pair of annular bearings 29 provided with ball bearings 29' are disposed between the bowl and the motor. The fluid is conducted from the hollow drive shaft 17 to the inner tube 24 by means of a short pipe 30 mounted in the upper end of the bore 17, the pipe having an angle fitting 31 connected with a tube 32 having a nut 33 at one end and a wing nut 34 at its opposite end which is connected to the valve 25.

Thus, after the reinforcing material has been introduced into the tube as aforesaid, and the tube fitted within the flange portion, as shown in Fig. 1, the member 22 is rotated, thereby causing the reinforcing material to assume the position indicated at 36 over the inner surface of the flattened area of the tube. After the tube has been rotated at a speed equivalent to normal driving speed for some 15 or 20 seconds, to permit an even dispersion of the reinforcing material, the coagulating material is introduced into the tire through the hollow drive shaft and the tube 32 in the following manner:

The coagulating fluid passes into the apparatus through an inlet tube 38, which is connected with a suitable reservoir (not shown). This tube passes through an aperture 39 adjacent to the base portion of the casing 10. The inner terminal of the tube is provided with a suitable fitting 40 which is connected with a conventional check valve comprising a ball 41, a spring 42 and a casing 43. This valve is positioned in the lower end of a block 45 having a circular piston chamber 46, which is closed at its inner end 47 and open at its outer end 48, the lower valve assembly communicating with the inner end of the piston chamber. The fluid is adapted to be drawn into the piston chamber by means of a piston 49, having an integrally formed piston rod 50, the opposite end of which is provided with a second piston 51, which is adapted to move in a second cylinder 52. This cylinder 52 is formed with a flange 53 at its inner end which is secured to the vertical support 10 by means of screws 54. The cylinder terminates in a reduced threaded portion 55 which is provided with an internally threaded cap 56, which retains suitable packing 57. The opposite end of this cylinder is formed with a wall 58 and a reduced portion 59, having a bore 60 therethrough. The cylinder is further formed with inlet ports 61 and 62 at opposite ends thereof and the piston 51 is caused to move backwards and forwards by means of air pressure hereinafter described. Thus, as air enters the cylinder through the port 61 for the intake stroke, the piston 51 is caused to move outwardly, and when the air enters the inlet port 62, the piston is moved in the opposite direction, causing the piston 47 to force the liquid up into the inner tube.

The amount of the coagulating liquid which will be drawn into the cylinder 46 in any given instance is dependent upon the size of the tire which is being treated. Accordingly, the outward movement of the piston 51 is limited by means of a rod 64 which is fitted within the bore 60 in the reduced portion 59 of the cylinder. This rod is formed with a knurled handle 65 at its outer end and a plurality of square notches 66 into which a pin 67, positioned within an aperture 68, passes. This pin is urged downwardly by means of a flat depression spring 69 which is mounted on the upper surface of the cylinder 52 by means of screws 70. When a longer or shorter stroke is desired, the pin 65 is raised and the desired notch placed adjacent to the lower end of the pin, which then is forced into the said notch. An angle bar 72 is secured to the lower surface of the cylinder 52 and is provided with suitable markings, as at 73, to indicate the exact position of the knurled handle 65.

The block 45, which is secured within the hollow casing by means of a machine screw 75, is formed with a vertical bore 76 of substantially the same size as the external diameter of the lower end 18 of the vertical drive shaft. This bore is further formed with an enlarged portion 77 in which suitable packing 78 is positioned, the packing being held in this recess by means of a packing gland nut 79. When the coagulating fluid is being drawn into the piston chamber in the block 45, the passage into the drive shaft 16 is closed by means of a check valve comprising a ball 80, a spring 81 and a retaining screw 82. On the inward stroke, however, the lower valve is closed and the upper valve opened.

Figure 2:
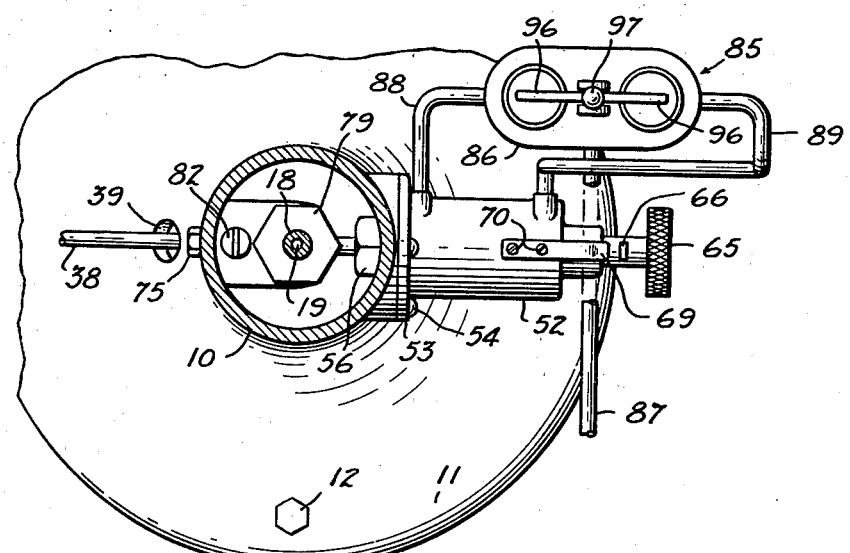
Fig. 2 is a broken, horizontal section taken on line 2—2 of Fig. 1.

The piston 51 is adapted to be actuated by means of the two-way valve structure 85, illustrated in Figs. 1 and 2. This structure comprises a casing 86, provided with an inlet 87 which leads to the source of supply of the compressed air (not shown). An air conduit 88 is connected with the port 61 at the inner end of the cylinder 52 and a second conduit 89 at the opposite end of the casing is connected with the port 62 at the outer end of the cylinder. The casing is further provided with valves 90 and 91 which are maintained in closed position by means of springs 92—92. These valves are adapted to be opened by plungers 94 and 95, respectively, said plungers being engaged at their upper ends by means of fingers 96 secured to a manually actuated lever 97 which is pivotally mounted on the upper side of the casing at 98. When it is desired to move the piston 51 outwardly so as to draw the coagulating fluid into the cylinder in the block 45, the lever 97 is moved to the left, thereby depressing the plunger 94 and the valve 90. Thus the compressed air in the chamber 99 in the casing is permitted to pass into the conduit 88 and into the cylinder 52, thereby drawing a charge of the coagulating fluid into the cylinder in the block 45. The lever 97 is then moved to the right, thereby closing the valve 90 and opening the valve 91, causing the air to pass into the cylinder 52 through the port 62. The casing is provided with air outlets 100 and 101 to permit the compressed air from the cylinder 52 to escape when the piston is moved in either direction.

Figures 3, 4:
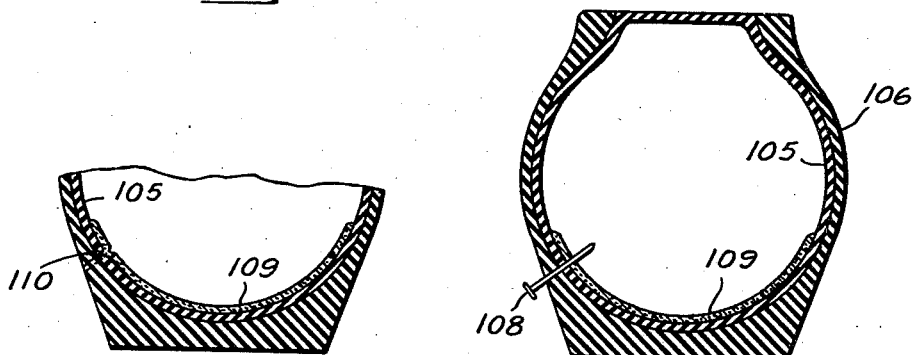
Fig. 3 is a transverse section taken through a tube and casing, the view showing the nail having entered the side wall of the tire.
Fig. 4 is a broken transverse section showing the relative position of the parts of the tube and the reinforcing strip after the nail has been removed.

In Figs. 4 and 5 I have illustrated transverse sections of tires showing the method whereby the tube is sealed after a nail or other sharp article which has entered the tire and tube has been removed. The tube 105 is shown as being positioned within a casing 106 having a tread 107. A nail 108 is shown as having entered the tire and tube from the side walls thereof. It will be noted that the band of deposited reinforcing material 109 extends into the side walls of the tube, as has heretofore been described. When the nail is removed, the tube 105 and the reinforcing band 109 is caused to move slightly into the aperture 110 which has been formed in the casing. The band of semifluid material 109, however, is caused to move outwardly into the tube, completely filling the aperture therein under the influence of the air pressure in the tube. As soon as the sealing material comes in contact with the inner surface of the casing, it almost instantaneously begins to coagulate, thereby effecting the complete closure of the aperture in the tube.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. In an inner tube reinforcing device, a circular rotating member provided with a tube enclosing band extending therearound, means for rotating the member and means for introducing fluid into the tube while under rotation, said means comprising a hollow shaft for supporting said circular member, a gland supporting one end of said shaft, said gland having means associated therewith for introducing a predetermined charge of a fluid into said shaft, and fluid conduit means at the opposite end of said shaft communicating with said tube.

2. In a device of the class described, a circular rotating member having means for supporting the outer periphery of a partially inflated inner tube containing a fluid sealing liquid and to impart centrifugal motion thereto, and means for introducing a coagulating fluid into the tube after rotation thereof has begun, said means comprising a hollow rotatable shaft supporting said rotating member, a fluid conduit extending between one terminal of said hollow shaft and said tube, a gland structure receiving the opposite terminal of said shaft and means including a cylinder and piston for introducing a predetermined charge of the coagulating fluid into said shaft while under rotation.

3. In a device of the class described, a hollow drive shaft, a rotatable member carried thereby, said member being provided with an annular band for supporting a partially inflated inner tube or the like, fluid conduit means extending between one terminal of the hollow shaft and the tube for introducing fluid thereinto while under rotation, and a gland structure at the opposite end of the drive shaft having means associated therewith for directing a predetermined charge of the fluid into the hollow shaft.

4. In an inner tube reinforcing device, the combination of a flanged centrifuge adapted to support a partially inflated inner tube and impart centrifugal motion to a quantity of a sealing fluid contained therein and means for introducing a coagulating fluid into the tube while the latter is being rotated, said means comprising a hollow rotatable shaft upon which the centrifuge is mounted, a fluid conduit means extending between the tube and one end of the shaft, a casing for receiving the opposite end of the shaft, packing means associated with the casing and means for introducing a predetermined charge of the coagulating fluid into the casing under pressure.

5. The method of reinforcing an inner tube or the like which consists in introducing a quantity of a fluid sealing substance into the tube, then rotating the tube to effect a uniform distribution of the substance around the inner surface of the outer periphery thereof and then while thus being rotated, introducing a coagulating substance into the tube.

6. In an apparatus for reinforcing inner tubes, a circular rotatable member having an annular tube embracing portion, means for rotating the member, a shaft for supporting the rotatable member, a fluid conducting passageway extending axially of said shaft for carrying fluid to be introduced into the tube while under rotation, fluid conduit means communicating with one end of said passageway for carrying fluid from the passageway to the tube being rotated, means for introducing a predetermined charge of fluid into the opposite end of said passageway, and a gland associated with said passageway to effect a fluid tight seal during rotation of the circular member.

7. In an apparatus for reinforcing inner tubes, a circular rotatable member having an annular tube embracing portion, means for rotating the member, a shaft for supporting the rotatable member, a fluid conducting passageway extending axially of said shaft for carrying fluid to be introduced into the tube while under rotation, fluid conduit means communicating with one end of said passageway for carrying fluid from the passageway to the tube being rotated, means for automatically measuring a charge of fluid of predetermined amount, means for introducing said predetermined charge of fluid into the opposite end of said passageway, and a gland associated with said passageway to effect a fluid tight seal during rotation of the circular member.

8. In an apparatus for reinforcing inner tubes, a circular rotatable member having an annular tube embracing portion, means for rotating the member, a shaft for supporting the rotatable member, a fluid conducting passageway extending axially of said shaft for carrying fluid to be introduced into the tube while under rotation, fluid conduit means communicating with one end of said passageway for carrying fluid from the passageway to the tube being rotated, means for automatically measuring a charge of fluid of predetermined amount, means for introducing said predetermined charge of fluid into the opposite end of said passageway, and means for adjusting the automatic measuring means to vary the amount of the charge.

9. The method of reinforcing an inner tube or the like which comprises introducing a quantity of fluid sealing substance into the tube, inflating the tube, rotating the inflated tube to effect a substantially uniform distribution of the fluid sealing substance around the inner surface of the outer periphery thereof, and introducing coagulating substance into the tube during the rotation thereof and while the tube is inflated.

10. The method of reinforcing an inner tube or the like which comprises introducing a quantity of fluid sealing substance into the tube, supporting the tube substantially in the form of a circular annulus about substantially its entire periphery, rotating the supported tube to effect a substantially uniform distribution of the fluid sealing substance around the inner surface of the outer periphery thereof, and introducing a coagulating substance into the tube during the rotation thereof.

11. The method of reinforcing an inner tube or the like which comprises introducing a quantity of fluid sealing substance into the tube, supporting the tube substantially in the form of a circular annulus, flattening the outer periphery of the annulus to a substantially cylindrical form, rotating the supported tube about the axis of said cylindrical periphery to effect a substantially uniform distribution of the fluid sealing substance around the inner surface of the cylindrical periphery thereof, and introducing a coagulating substance into the flattened tube during the rotation thereof.

12. The method of reinforcing an inner tube or the like which comprises introducing a quantity of fluid sealing substance into the tube, partially inflating the tube, flattening the outer periphery of the partially inflated tube to a substantially cylindrical form, rotating the partially inflated and flattened tube about the axis of said cylindrical periphery to effect a substantially uniform distribution of the fluid sealing substance around the inner surface of the flattened cylindrical periphery thereof, and introducing a coagulating substance into the flattened tube during the rotation thereof.

13. Apparatus for treating annular deformable tubes comprising a rotatable member having a substantially clindrical, inwardly directed surface for circumferentially embracing the outer wall of an inflated tube to flatten and support the same, means for rotating said member and tube around the axis of said surface to retain said outer wall of the tube pressed against the cylindrical surface by centrifugal force, and means for introducing a fluid into a rotating tube carried by the member.

14. Apparatus for treating annular deformable tubes comprising a member having a substantially cylindrical, inwardly directed surface for circumberentially embracing the outer wall of an inflated tube to flatten and support the same, a substantially vertical shaft for supporting the member for rotation about the axis of said surface, means for rotating the member, and means communicating with the interior of a tube supported by said suface for introducing a fluid into the tube during rotation of the tube and the member.

HERMAN T. KRAFT.